United States Patent [19]

Bahl et al.

[11] Patent Number: 4,926,473
[45] Date of Patent: May 15, 1990

[54] LONGITUDINAL BALANCE SYSTEM

[75] Inventors: Harsh V. Bahl, Bolingbrook; Laurence L. Sheets, St. Charles, both of Ill.

[73] Assignee: Rockwell International Corporation, El Segundo, Calif.

[21] Appl. No.: 346,322

[22] Filed: Apr. 27, 1989

Related U.S. Application Data

[63] Continuation of Ser. No. 89,699, Aug. 25, 1987, abandoned.

[51] Int. Cl.[5] .............................................. H04M 1/74
[52] U.S. Cl. ..................................... 379/416; 379/398
[58] Field of Search ............... 379/394, 398, 416, 417, 379/414

[56] References Cited

U.S. PATENT DOCUMENTS

| | | | |
|---|---|---|---|
| 4,357,494 | 11/1982 | Chambers, Jr. | 379/346 |
| 4,431,874 | 2/1984 | Zobel et al. | 379/405 |
| 4,540,852 | 9/1985 | Albouy et al. | 379/382 |
| 4,706,281 | 11/1987 | Cubbison, Jr. | 379/322 |

FOREIGN PATENT DOCUMENTS 0163275  12/1985  European Pat. Off. ............ 379/416

Primary Examiner—Thomas W. Brown
Attorney, Agent, or Firm—Carmen B. Patti; V. L. Sewell; H. F. Hamann

[57] ABSTRACT

A longitudinal cancellation circuit for use in circuits providing a received differential signal containing a desired differential component and an undesired longitudinal component has a first multiplier for multiplying received differential signal with the longitudinal signal to produce a first signal having at least a DC component in addition to other frequency components. The first signal is received by a low-pass filter which produces a second signal containing only the DC component. A second multiplier multiplies the second signal with the undesired longitudinal signal to produce a third signal equal to the to the undesired longitudinal component. The third signal is subtracted from the received differential signal to produce the desired differential signal which is free of undesired longitudinal component.

6 Claims, 1 Drawing Sheet

4,926,473

LONGITUDINAL BALANCE SYSTEM

This application is a continuation of application Ser. No. 07/089,699, filed on Aug. 25, 1987, now abandoned.

BACKGROUND OF THE INVENTION

The present invention relates in general to longitudinal cancellation circuits for use with telephone signal systems, and, in particular, to a longitudinal cancellation circuit in which precise matching of current and voltage sources, and other passive components is not required.

Long cancellation circuits are well known in the prior art. These devices can use voltage sources to drive the differential signal onto the line. If the longitudinal cancellation approach is used within this path, it necessitates precisely matched feed resistors to obtain good longitudinal balance. If the feed resistors are not matched, the longitudinal signal converts into a differential signal proportional to the mismatch. It is then impossible to differentiate between the telephone differential signal received, and the longitudinal converted differential signal.

It is also known in the prior art, that this problem of matching feed resistors can be eliminated by the use of voltage-controlled current sources connected to the tip-and-ring terminals of the circuit. If the current sources are identical, the longitudinal balance becomes independent of the feed resistors. However, it has been found that in order to ensure that the current sources are matched, extremely high cost circuit elements are required.

This problem in the prior art is overcome by the present invention which allows the matching of the current sources to be relaxed enough to make the circuit economical to manufacture.

SUMMARY OF THE INVENTION

In providing a solution to the problem of matching the current sources in the circuit the present invention provides two multipliers, a low-pass filter and high-gain clamp circuit for cancelling any differential signal resulting from the mismatch of the current sources with regard to the longitudinal signal.

The novel longitudinal cancellation circuit is for use in a circuit providing a received differential signal which contains a desired differential component and an undesired longitudinal component. The received differential signal is first multiplied with longitudinal signal appearing at the tip and ring to produce a first signal having a DC component along with other frequency components. This first signal is passed through a low-pass filter to produce a second signal containing substantially only the DC component. A second multiplier multiplies the second signal with the undesired longitudinal signal to produce a third signal substantially equal to the undesired longitudinal differential signal. Finally, the third signal is subtracted from the received differential signal to produce the desired differential component.

When the desired differential component is correlated with the undesired longitudinal it is necessary to use a high-gain clamp which receives the second signal an outputs a clamp signal to the second multiplier. The high-gain clamp ensures that the desired differential component is not cancelled in the subtracting phase.

BRIEF DESCRIPTION OF THE DRAWING

The features of the present invention which are believed to be novel are set forth with particularity in the appended claims. The invention, together with further objects and advantages, may best be understood by reference to the following description taken in conjunction with the accompanying drawing, in which:

DESCRIPTION OF THE PREFERRED EMBODIMENT

Figure 1:
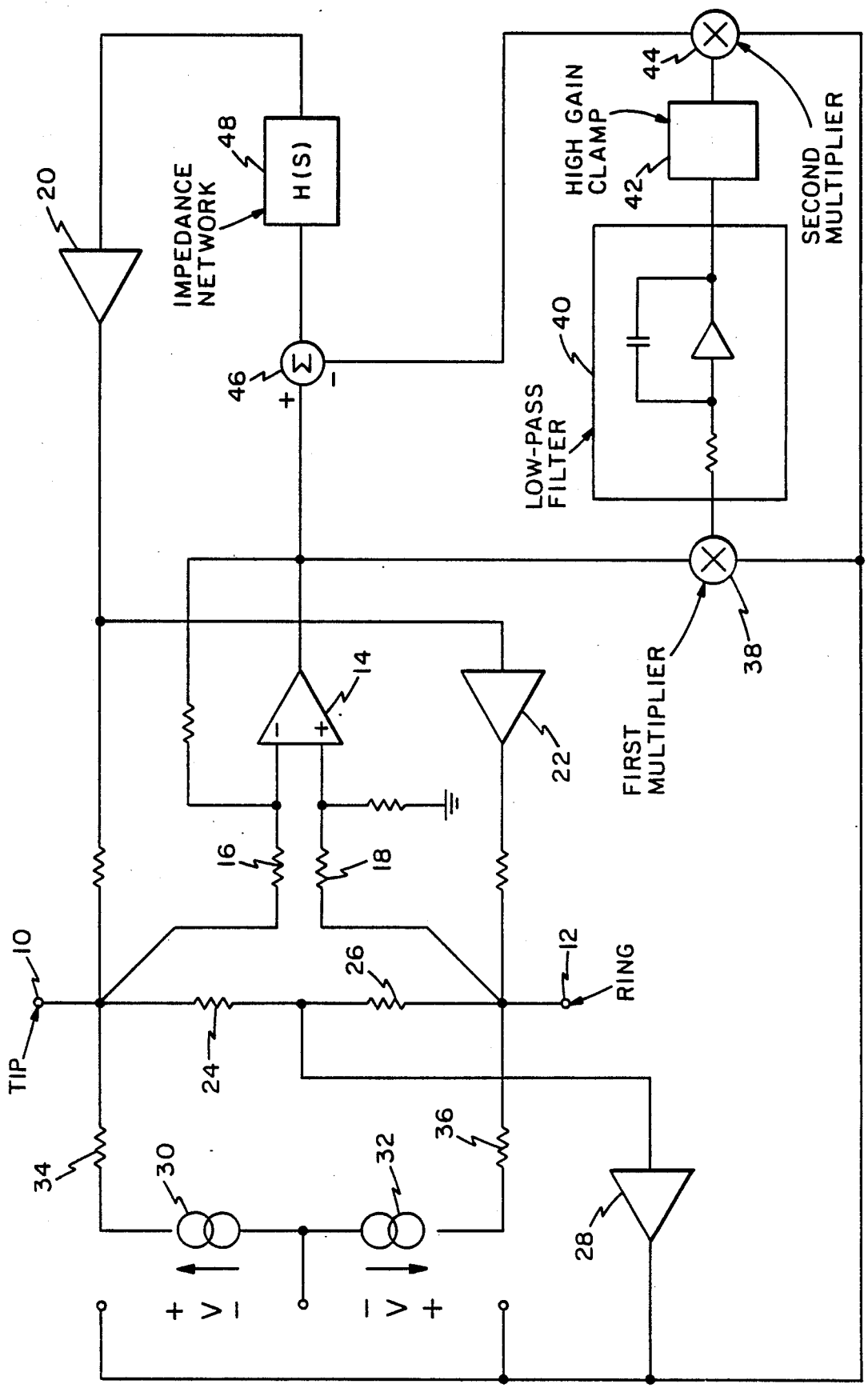
FIG. 1 is a schematic diagram of a circuit embodying the present invention.

The novel circuit of the present invention has general applicability, but is most advantageously utilized in a circuit for receiving telephone signals on tip-and-ring terminals. The preferred embodiment of the present invention will be discussed in terms of receiving a tone signal on the tip-and-ring terminals, however, it is to be understood that the present invention applies equally well to the circuit when other signals, such as speech are received at the tip-and-ring terminals. As shown in the schematic in FIG. 1, the signals are received at a tip terminal 10 and a ring terminal 12. A differential amplifier 14 receives a tip signal from terminal 10 through feed resistor 16 and a ring signal from terminal 12 through feed resistor 18. As is known in the prior art, an impedance network 48 provided in the differential feedback path is connected to the output of the differential amplifier 14 which in turn is connected to the tip-and-ring terminals 10 and 12 through amplifiers 20 and 22 respectively. The impedance network 48 determines the differential impedance that will be generated at the tip-and-ring terminals 10 and 12. These components form the differential path in the circuit.

In order to cancel out longitudinal current appearing at the tip-and-ring terminals 10 and 12, a longitudinal feedback path is provided in the circuit. This path comprises resistors 24 and 26 connected to the tip-and-ring terminals 10 and 12, respectively. The juncture of the resistors 24 and 26 is connected to the input of longitudinal amplifier 28. The output of the longitudinal amplifier 28 provides the voltage for "matched" voltage-controlled current sources 30 and 32. As is known in the prior art, the current sources 30 and 32 create equal but opposite currents to longitudinal currents appearing at tip-and-ring terminals 10 and 12, and are connected to those terminals by resistors 34 and 36, respectively. However, as was previously discussed, unless the current sources 30 and 32 are perfectly matched, there will still result longitudinal components in differential signal appearing at the output of the differential amplifier 14 in addition to the desired differential component.

The present invention provides a circuit for cancelling out this residual longitudinal component which may appear at the output of differential amplifier 14, thus reducing the need for critical matching. For purposes of this description, the output of longitudinal amplifier 28 is referred to as the undesired longitudinal signal and the output of differential amplifier 14 is referred to as the received differential signal which contains both a desired tone differential signal and the undesired longitudinal component. As shown in FIG. 1, the multiplier 38 has an input connected to the output of differential amplifier 14 and another input connected to the output of amplifier 28. A first signal appears on the output of multiplier 38 and contains three components: a DC component, a component which is twice the frequency of the frequency of the longitudinal signal, and a component which is a product of the differential and longitudinal signals. The input of a low-pass filter 40 is connected to the output of the first multiplier 38. The low-pass filter 40 produces at an output a second signal which is only the DC component of the first signal. A high-gain clamp 42 insures that the DC level of the second component cannot exceed the predetermined maximum value, and is utilized when the longitudinal signal is correlated with the received signal. The signal containing the DC component is received on an input of a second multiplier 44. Another input of the second multiplier 44 receives the undesired longitudinal signal from amplifier 28. The multiplier 44 multiplies these two signals such that the output of multiplier 44 contains only the undesired longitudinal differential signal. A summer 46 has a positive input connected to the output of differential amplifier 14 and a negative input connected to the output of the second multiplier 44. The positive input and negative input of the summer 46 represent an inversion of the signal from the output of multiplier 44. The summer 46 combines signals received which results in cancellation of the undesired longitudinal differential signal leaving only the desired tone differential component.

The received differential signal at the output of the differential amplifier 14 can be expressed as (where $\alpha$ is the differential gain of differential amplifier 14 and $\omega l$ and $\omega_d$ represent the longitudinal frequency and differential frequency, respectively):

$$y = \alpha x + \epsilon; \quad \quad 1.$$

$$x = \cos \omega_l t; \quad \quad 2.$$

$$\epsilon = \cos \omega_d t; \quad \quad 3.$$

The output of the longitudinal amplifier 28 can be represented as Ax where A is the longitudinal gain of amplifier 28. The following expressions describe the operation of the longitudinal cancellation. The output of the multiplier 38 can be expressed as:

$$(y)(Ax) = (\alpha x + \epsilon)(Ax) \quad \quad 4.$$
$$= A\alpha x^2 + A\epsilon x$$

Substituting equations 2 and 3 in 4 and using trigonometric identities to simplify results in:

$$(y)(Ax) = \frac{A\alpha}{2} + \frac{A\alpha}{2} \cos 2\omega_l t + A \cos \omega_l t \cos \omega_2 t$$

dc term   Product (2f)   Uncorrelated
          term           term

The output of the low pass filter 40, $(A\alpha)/2$, when multiplied with the output of longitudinal amplifier 28 and appropriately attenuated will result in the undesired longitudinal component ($\alpha x$) present in y. This can subsequently be subtracted from y via a summer 46 to make the differential signal free of the longitudinal component.

It is to be further understood that the equations representing the process for cancellation can be implemented using digital technology as well a the implementation shown in FIG. 1. The invention is not limited to the particular details of the apparatus depicted, and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

We claim:

1. A longitudinal cancellation circuit For use in a circuit providing a received differential signal containing a desired tone differential component and an undesired longitudinal component, comprising:

first means for multiplying said received differential signal with said longitudinal component to produce a first signal having at least a substantially DC component;

means for low pass filtering said first signal to produce a second signal, containing substantially only said DC component;

second means for multiplying said second signal, the undesired longitudinal component to produce a third signal; and means for subtracting said third signal from said received differential signal to produce a final signal having said desired tone differential component and free of said longitudinal component.

2. The longitudinal cancellation circuit described in claim 1 wherein said longitudinal cancellation circuit further comprises means for providing a high gain clamp receiving said second signal and outputting a clamped signal to said second means for multiplying, said high gain clamp ensuring that said desired tone differential component is not cancelled in said means for subtracting when said desired tone differential component is correlated with said undesired longitudinal component.

3. A longitudinal cancellation circuit having tip and ring terminals for receiving tip and ring input signals, said circuit comprising:

first means for receiving the tip input signal on a tip input and having first and second outputs;

second means for receiving the ring input signal on a ring input and having first and second outputs;

a differential amplifier having its inputs operatively connected to said first outputs of said first and second receiving means and producing a received differential signal on an output;

a longitudinal amplifier having an input operatively connected to said second outputs of said first and second receiving means and producing a longitudinal component on an output;

first and second voltage controlled current sources operatively connected to said inputs of said first and second receiving means, respectively, said longitudinal amplifier controlling the outputs of said current sources;

first means for multiplying said received differential signal and said longitudinal component to produce a first signal;

means for DC filtering which receives said first signal and produces a second signal having substantially only a DC component of said first signal;

second means for multiplying said second signal and said longitudinal component to produce a third signal;

means for inverting said third signal producing an inverted third signal;

means for summing said inverted third signal with said received differential signal thereby producing an output differential signal on an output thereof; and a predetermined impedance network having an input operatively connected to said output of said means for summing and having first and second outputs operatively connected to said inputs of said first and second receiving means.

4. The circuit described in claim 3 wherein said means for DC filtering comprises:

means for low-pass filtering, receiving said first signal and having an output; and means for clamping having an input operatively connected to said output of said means for low-pass filtering, the means for clamping having a predetermined high gain and producing said second signal.

5. A method for longitudinal cancellation for use in a circuit providing a received differential signal containing a desired tone differential component and an undesired longitudinal component, comprising;

multiplying said received differential signal with said longitudinal component to produce a first signal having at least a substantially DC component;

filtering said first signal to produce a second signal containing substantially only said DC component;

multiplying said second signal with the undesired longitudinal component to produce a third signal substantially equal to the undesired longitudinal component; and subtracting said third signal from said received differential signal to produce a final signal having said desired tone differential component and free of said longitudinal component.

6. The method described in claim 5 wherein said method further comprises clamping the DC level of said second signal to a predetermined limit to ensure that the desired differential component is not cancelled when said desired differential component is correlated with the undesired longitudinal component.

* * * * *